(12) United States Patent
Purvis et al.

(10) Patent No.: US 7,571,927 B2
(45) Date of Patent: Aug. 11, 2009

(54) HEADLINER ASSEMBLY HAVING A TETHER

(75) Inventors: Glenn G. Purvis, Commerce Township, MI (US); Brian J. Reynolds, Oxford, MI (US); John F. Mola, Ferndale, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 138 days.

(21) Appl. No.: 11/163,752

(22) Filed: Oct. 28, 2005

(65) Prior Publication Data

US 2007/0096440 A1 May 3, 2007

(51) Int. Cl.
*B60R 21/16* (2006.01)

(52) U.S. Cl. .................................. 280/728.2

(58) Field of Classification Search ............. 280/728.2, 280/730.2, 730.1, 743.2, 743.1; 296/214; 24/115 K, 265 CD; *B60R 21/20*
See application file for complete search history.

(56) References Cited

U.S. PATENT DOCUMENTS

| | | | | |
|---|---|---|---|---|
| 2,834,606 A | * | 5/1958 | Bertrand | 280/730.1 |
| 3,774,936 A | * | 11/1973 | Barnett et al. | 280/730.1 |
| 5,265,903 A | * | 11/1993 | Kuretake et al. | 280/730.2 |
| 5,470,103 A | * | 11/1995 | Vaillancourt et al. | 280/730.1 |
| 5,775,726 A | * | 7/1998 | Timothy et al. | 280/730.1 |
| 6,102,436 A | * | 8/2000 | Bayley et al. | 280/753 |
| 6,173,990 B1 | | 1/2001 | Nakajima et al. | |
| 6,231,072 B1 | | 5/2001 | Pywell et al. | |
| 6,409,210 B1 | * | 6/2002 | Emerling | 280/730.2 |
| 6,709,010 B2 | | 3/2004 | Dominissini et al. | |
| 6,851,702 B2 | * | 2/2005 | Henderson et al. | 280/728.2 |
| 7,237,798 B2 | * | 7/2007 | Mori et al. | 280/730.1 |
| 2002/0190508 A1 | | 12/2002 | Jost | |
| 2004/0066022 A1 | * | 4/2004 | Mori et al. | 280/730.1 |
| 2004/0090050 A1 | | 5/2004 | Dominissini et al. | |
| 2004/0212185 A1 | * | 10/2004 | Daines et al. | 280/743.2 |
| 2004/0239084 A1 | * | 12/2004 | Mori et al. | 280/730.1 |
| 2005/0001412 A1 | * | 1/2005 | Schneider et al. | 280/730.1 |
| 2005/0029778 A1 | * | 2/2005 | Weber et al. | 280/728.2 |

* cited by examiner

*Primary Examiner*—Paul N. Dickson
*Assistant Examiner*—Robert A. Coker
(74) *Attorney, Agent, or Firm*—Brooks Kushman P.C.

(57) ABSTRACT

A headliner assembly is provided for use with a vehicle having an inflatable air bag disposed proximate a roof of the vehicle. The headliner assembly includes a headliner configured to extend underneath the air bag and having a front portion and a rear portion. The headliner assembly further includes a tether for connecting the rear portion of the headliner to a rear portion of the vehicle. The tether is configured to cooperate with the headliner to control deployment of the air bag.

24 Claims, 3 Drawing Sheets

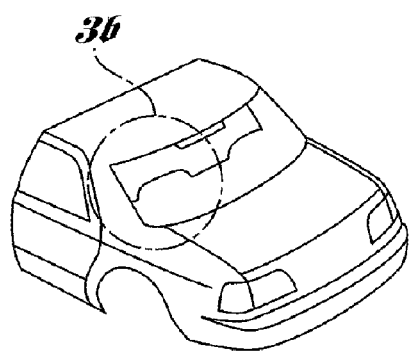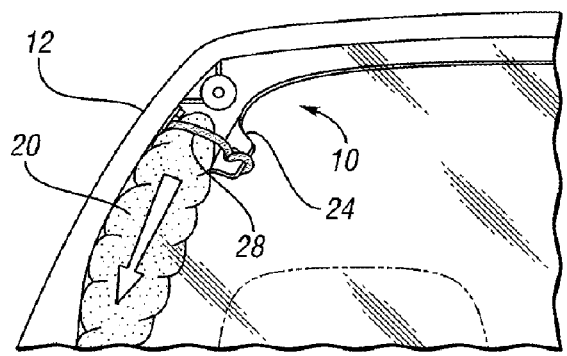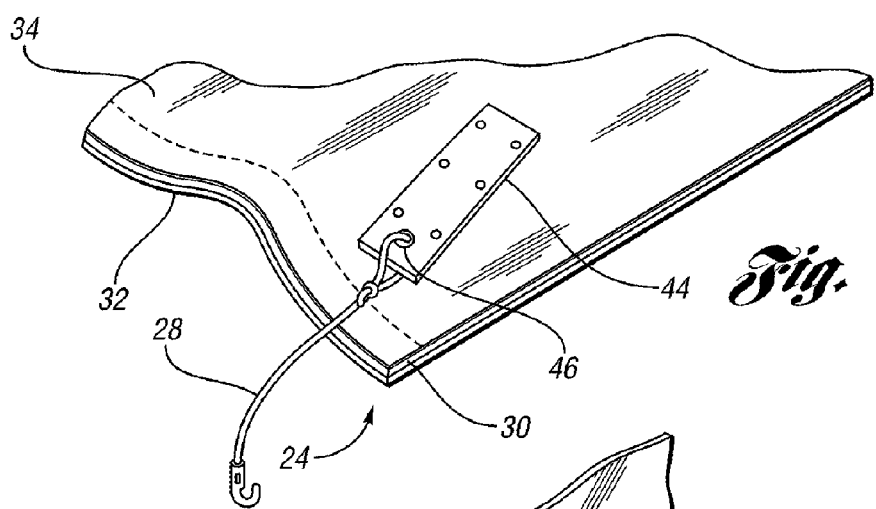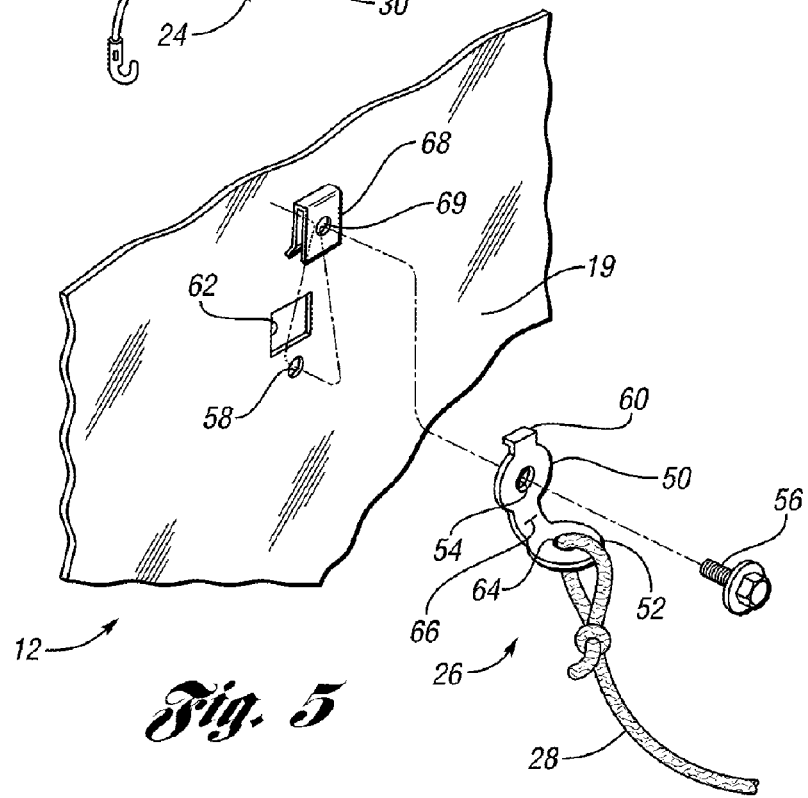

HEADLINER ASSEMBLY HAVING A TETHER

BACKGROUND OF THE INVENTION

1. Field of the Invention

The invention relates to a headliner assembly for facilitating deployment of an air bag system.

2. Background Art

A vehicle may be provided with an overhead air bag system and a headliner assembly that covers the air bag system. Patent Application Publication No. 2004/0090050 A1, for example, discloses such an arrangement.

SUMMARY OF THE INVENTION

Under the invention, a new headliner assembly is provided for use with a vehicle having an inflatable air bag disposed proximate a roof of the vehicle. In one embodiment, the headliner assembly includes a headliner configured to extend underneath the air bag and having a front portion and a rear portion. The headliner assembly further includes a tether for connecting the rear portion of the headliner to a rear portion of the vehicle. The tether is configured to cooperate with the headliner to control deployment of the air bag.

In another embodiment, the headliner assembly includes a headliner configured to extend underneath the air bag, a tether bracket configured to be attached to the vehicle, and a tether for connecting the headliner to the tether bracket. The tether is configured to control movement of the headliner during deployment of the air bag. Furthermore, the tether bracket is configured to deform without breaking during deployment of the air bag, to thereby absorb deployment energy.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 3a is a rear perspective view of the vehicle;

FIG. 3b is a rear view of the vehicle showing an air bag of the driver side air bag system in a deployed position;

FIG. 4 is a perspective view of a rear portion of the headliner showing an alternative tether attachment location; and FIG. 5 is a perspective view of one of the tether brackets.

DETAILED DESCRIPTION

Figure 1:
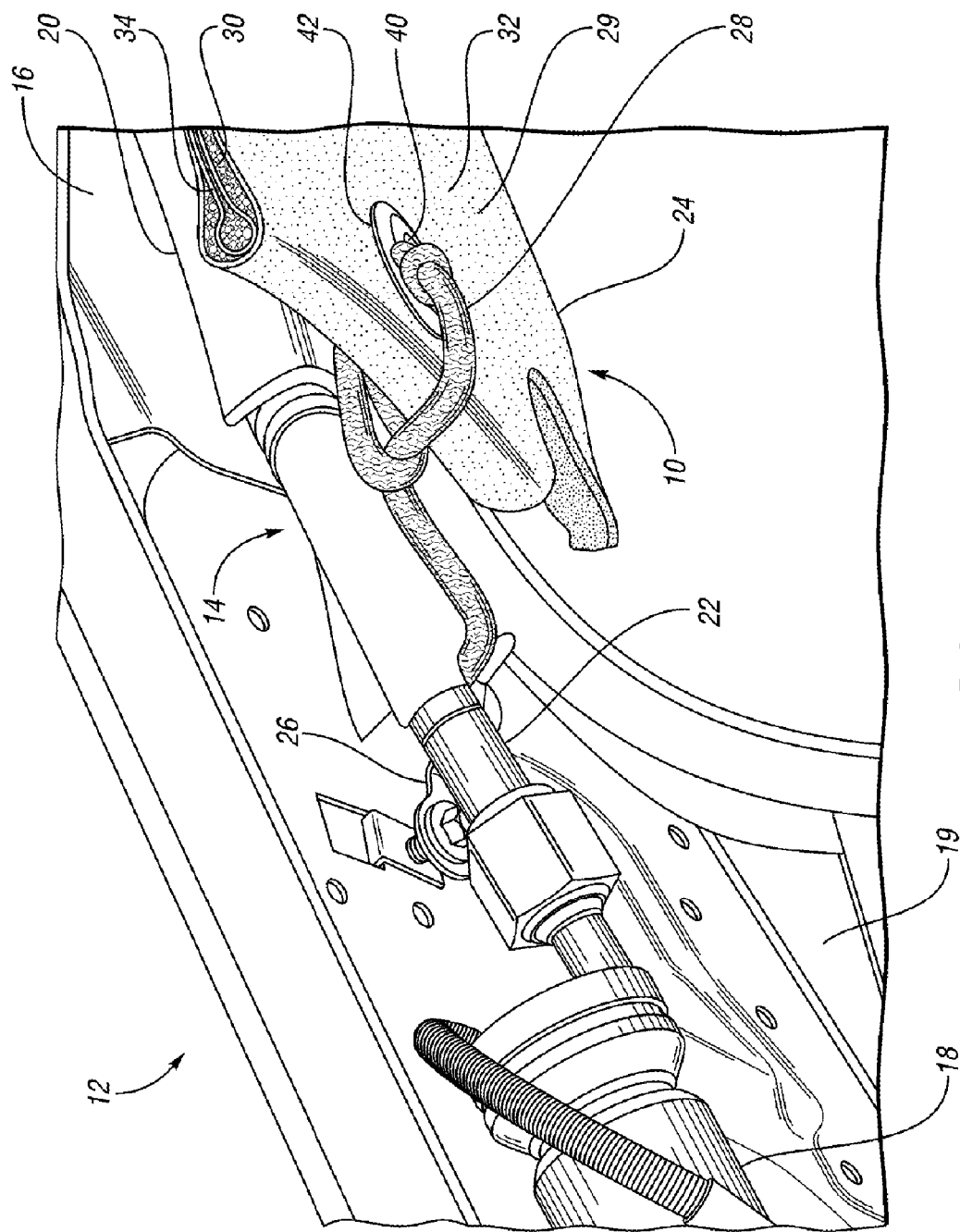
FIG. 1 is a perspective view of a rear portion of a headliner assembly according to the invention mounted in a vehicle.
Figure 2:
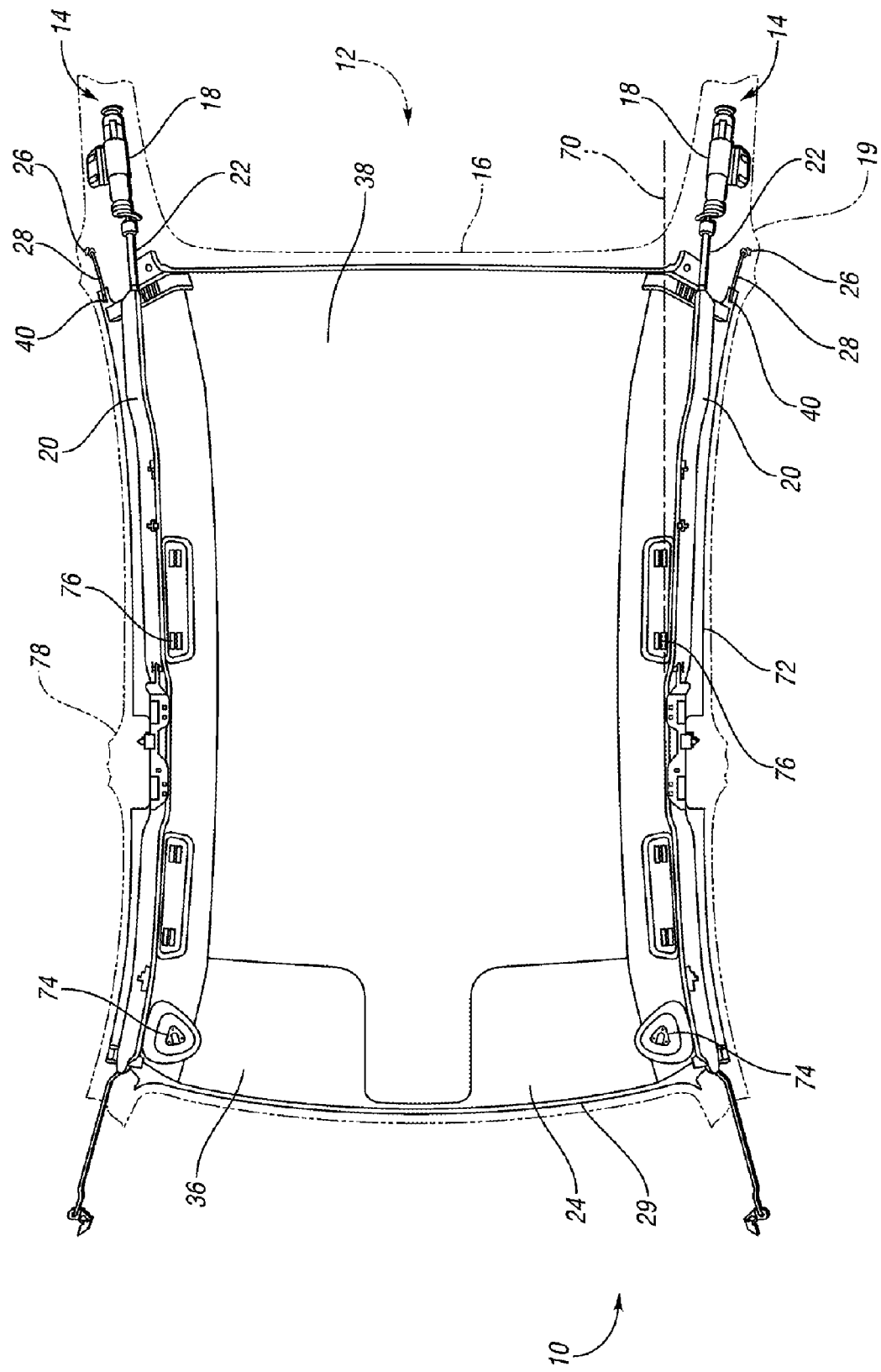
FIG. 2 is a top view of the headliner assembly, along with driver side and passenger side air bag systems, mounted to a roof (shown in phantom lines) of the vehicle, wherein the headliner assembly includes a headliner, two tethers attached to a rear portion of the headliner, and two tether brackets for attaching the tethers to the vehicle.

FIGS. 1 and 2 show a headliner assembly 10 according to the invention for use with a vehicle 12 having one or more overhead air bag systems 14 disposed proximate a roof 16 of the vehicle 12. In the embodiment shown in FIG. 2, the vehicle 12 is provided with two air bag systems 14 disposed on opposite sides of the roof 16. Each air bag system 14 includes an inflator 18 attached to a support structure, such as a C-pillar 19 or roof 16, and an inflatable air bag 20 attached to the roof 16 and connected to the inflator 18 by an air passage 22. Upon inflation, each air bag 20 is configured to extend generally downwardly along a side of the vehicle 12, such as shown in FIG. 3b (the driver side air bag 20 is shown in a deployed position in FIG. 3b).

The headliner assembly 10 may be configured to control deployment of each air bag 20, as explained below in detail. Referring to FIGS. 1-3b, the headliner assembly 10 includes a headliner 24 configured to extend underneath the air bags 20, one or more tether brackets 26 configured to be attached to the vehicle 12, and one or more tethers 28 for connecting the headliner 24 to the tether brackets 26. In the embodiment shown in FIG. 2, the headliner assembly 10 includes two tether brackets 26 and two tethers 28 for connecting opposite sides of the headliner 24 to the vehicle 12.

The headliner 24 may have any suitable configuration and may be manufactured in any suitable manner. For example, the headliner 24 may include a headliner body 29 having a substrate 30 and a cover layer 32 attached to one side of the substrate 30 for providing a finished surface that faces toward a passenger compartment of the vehicle 12. In the embodiment shown in FIG. 1, the headliner 24 also includes a reinforcing layer, such as scrim layer 34, attached to an opposite side of the substrate 30. The substrate 30, cover layer 32 and scrim layer 34 may be made of any suitable natural or synthetic material, such as polymeric material.

The headliner 24 includes front and rear portions 36 and 38, respectively, that are disposed proximate front and rear portions, respectively, of the vehicle 12 when the headliner assembly 10 is mounted in the vehicle 12. The headliner 24 also includes multiple attachment locations 40 for attaching the rear portion 38 of the headliner 24 to the tethers 28. For example, each attachment location 40 may be defined by a metal or plastic grommet 42 attached to the headliner body 29, such as shown in FIG. 1. In the embodiment shown in FIG. 1, the headliner body 29 is folded over upon itself proximate the attachment location 40, and the grommet 42 extends through two layers each of the substrate 30, cover layer 32 and scrim layer 34.

Alternatively, the headliner 24 may be provided with any suitable attachment locations for attaching the headliner 24 to the tethers 28. Referring to FIG. 4, for example, each attachment location may be defined by an attachment member 44, such as rigid plastic or hardboard, connected to the substrate 30 and/or scrim layer 34, and including an aperture 46 that is configured to receive a tether 28.

Referring to FIG. 2, the tether brackets 26 are attachable on opposite sides of the vehicle 12, proximate the rear portion of the vehicle 12. For example, referring to FIG. 1, each tether bracket 26 may be attached to a C-pillar 19 of the vehicle 12 (the driver side tether bracket 26 and air bag system 14 are shown in FIG. 1).

Referring to FIG. 5, each tether bracket 26 may include an attachment portion 50 that is configured to be attached to the vehicle 12, and a leg portion 52 extending from the attachment portion 50. The attachment portion 50 may be configured to be attached to the vehicle 12 in any suitable manner. For example, the attachment portion 50 may include an aperture 54 for receiving a fastener 56, such as a screw, which is also configured to extend into an opening 58 in the C-pillar 19. The attachment portion 50 may also include an anti-rotation member, such as a tab 60, that is engageable with an aperture 62 in the vehicle 12 to inhibit rotation of the tether bracket 26 with respect to the vehicle 12.

The leg portion 52 is configured to be attached to a respective tether 28 in any suitable manner. For example, the leg portion 52 may include an aperture 64 for receiving the tether 28.

Furthermore, the tether brackets 26 are configured to deform during deployment of the air bags 20 to thereby absorb deployment energy associated with the air bags 20. For example, the leg portion 52 of a respective tether bracket 26 may be configured to bend with respect to the attachment portion 50 upon deployment of a respective air bag 20. More specifically, the leg portion 52 may bend about a hinge line 66 during deployment of the air bag 20. As a result, each air bag 20 may effectively deploy without tearing the headliner 24 or breaking the associated tether bracket 26.

Alternatively, the tether brackets 26 may plastically deform in any suitable manner to absorb deployment energy. For example, each tether bracket 26 may lengthen during deployment of the associated air bag 20.

An intermediate member 68, such as a clip or J-nut 68 may also be positioned between each tether bracket 26 and the vehicle 12. Each intermediate member 68 may be configured to be inserted into a respective aperture 62 of the vehicle 12, and may include a threaded aperture 69 for receiving a respective fastener 56.

Returning to FIG. 1, each tether 28 may have any suitable configuration and may be made of any suitable material. For example, each tether 28 may be a flexible nylon cord. Furthermore, each tether 28 may be substantially taut when installed and prior to inflation of the air bags 20. Alternatively, each tether 28 may have slack when installed in the vehicle 12.

Referring to FIGS. 2 and 3, the tethers 28 are configured to cooperate with the headliner 24 to control deployment of the air bags 20, which may each extend substantially the entire length of the headliner 24. For example, during deployment of a respective air bag 20, the associated tether 28 may restrict inboard movement of the headliner 24. More specifically, the tether 28 may cooperate with the headliner 24 to define a hinge line 70 on the headliner 24 proximate a side edge 72 of the headliner 24, such that the headliner 24 is bendable along the hinge line 70 during deployment of the air bag 20 (FIG. 2 shows the hinge line 70 on the driver side of headliner 24). As a result, the headliner 24 may direct deployment of the air bag 20 toward the side of the vehicle 12, as shown in FIG. 3*b*.

The tethers 28 may also inhibit the headliner 24 from contacting vehicle occupants during deployment of the air bags 20. For example, the tethers 28 may be configured to allow only relatively small inward movement, such as six to eight inches, of the headliner 24.

Prior to deployment of the air bags 20, the rear portion 38 of the headliner 24 may be held in place by one or more trim pieces that extend over a rear edge of the headliner 24. Upon deployment of a respective air bag 20, the trim pieces are configured to release a corresponding side of the rear portion 38 of the headliner 24.

The remainder of the headliner 24 may be connected to vehicle 12 in any suitable manner. For example, the front portion 36 of the headliner 24 may be connected to the roof 16 with one or more sun visor brackets 74. In addition, an intermediate portion of the headliner 24 may be connected to the roof 16 with one or more brackets 76, such as grab handle and/or coat hook brackets disposed at or near B-pillars 78. Still further, the front portion 36 and/or intermediate portion of the headliner 24 may also be connected to the vehicle 12 with one or more tethers 28.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A headliner assembly for use with a vehicle having an inflatable air bag disposed proximate a roof of the vehicle, the headliner assembly comprising:
   a headliner configured to extend underneath the air bag, the headliner having a front portion and a rear portion;
   a tether connected to the rear portion of the headliner and configured to connect the rear portion of the headliner to a rear portion of the vehicle, the tether further being configured to cooperate with the headliner to control deployment of the air bag;
   a tether bracket connected to the tether; and
   a fastener that is configured to attach the tether bracket to the rear portion of the vehicle;
   wherein the headliner has an attachment location disposed proximate a rear edge of the headliner, the tether is attached to the attachment location of the headliner, the headliner includes a substrate and a grommet attached to the substrate, the grommet defines the attachment location, and the substrate is folded over proximate the attachment location, such that the grommet extends through two layers of the substrate.

2. The headliner assembly of claim 1 wherein the tether bracket includes an anti-rotation tab that is engageable with an aperture in the vehicle to inhibit rotation of the tether bracket with respect to the vehicle.

3. The headliner assembly of claim 2 wherein the tether bracket further comprises a fastener aperture spaced away from the anti-rotation tab, and wherein the fastener is configured to extend through the fastener aperture and into an opening in the vehicle to attach the tether bracket to the vehicle.

4. The headliner assembly of claim 1 wherein the tether is configured to connect the rear portion of the headliner to the vehicle proximate a C-pillar of the vehicle.

5. A headliner assembly for use with a vehicle having an inflatable air bag disposed proximate a roof of the vehicle, the headliner assembly comprising:
   a headliner configured to extend underneath the air bag;
   a tether bracket configured to be attached to the vehicle;
   a fastener that is configured to extend through the tether bracket and into an opening in the vehicle; and
   a tether connecting the headliner to the tether bracket, the tether being configured to control movement of the headliner during deployment of the air bag;
   wherein the tether bracket includes an attachment portion that is configured to be attached to the vehicle, and a leg portion having one end attached to the attachment portion and an opposite free end, and wherein the leg portion is connected to the tether, and the leg portion bends with respect to the attachment portion and without separating from the attachment portion during deployment of the air bag, to thereby absorb deployment energy.

6. The headliner assembly of claim 5 wherein the tether bracket includes an anti-rotation tab that is engageable with an aperture in the vehicle to inhibit rotation of the tether bracket with respect to the vehicle.

7. The headliner assembly of claim 6 further comprising an intermediate member that is disposable between the tether bracket and the vehicle such that the fastener extends through the intermediate member when the fastener extends through the tether bracket and into the opening in the vehicle, and wherein a portion of the intermediate member is also configured to extend into the aperture in the vehicle that receives the anti-rotation tab.

8. The headliner assembly of claim 6 wherein the tether bracket further comprises a fastener aperture that receives the fastener, and wherein the fastener aperture is spaced away from the anti-rotation tab.

9. The headliner assembly of claim 5 wherein the leg portion is configured to bend through an angle of at least ten degrees upon deployment of the air bag.

10. The headliner assembly of claim 5 wherein the tether bracket is configured to lengthen without breaking upon deployment of the air bag to thereby absorb deployment energy.

11. The headliner assembly of claim 5 wherein, during deployment of the air bag, the tether is configured to cooperate with the headliner to define a hinge line on the headliner proximate a side edge of the headliner, such that the headliner is bendable along the hinge line.

12. The headliner assembly of claim 5 wherein the headliner has an attachment location disposed proximate a rear edge of the headliner, and the tether is attached to the attachment location of the headliner.

13. The headliner assembly of claim 5 wherein the headliner has a front portion and a rear portion, and the tether is connected to the rear portion of the headliner.

14. The headliner assembly of claim 5 wherein the headliner includes a substrate and a grommet attached to the substrate, the grommet defining an attachment location that is attached to the tether.

15. The headliner assembly of claim 5 wherein the headliner is configured to extend laterally within the vehicle from a first location proximate one B-pillar of the vehicle to a second location proximate another B-pillar of the vehicle.

16. The headliner assembly of claim 5 wherein the tether is connected to the headliner proximate an outboard side edge of the headliner such that, during deployment of the airbag, the airbag extends between the side edge of the headliner and a side portion of the vehicle.

17. The headliner assembly of claim 5 wherein the tether bracket is configured to plastically deform without breaking during deployment of the air bag, to thereby absorb deployment energy.

18. The headliner assembly of claim 5 wherein the leg portion of the tether bracket includes an aperture, and the tether extends through the aperture.

19. A headliner assembly for use with a vehicle having an inflatable air bag disposed proximate a roof of the vehicle, the headliner assembly comprising:

a headliner configured to extend underneath the air bag;

a tether bracket configured to be attached to the vehicle;

a fastener that is configured to extend through the tether bracket and into an opening in the vehicle;

an intermediate member that is disposable between the tether bracket and the vehicle such that the fastener extends through the intermediate member when the fastener extends through the tether bracket and into the opening in the vehicle; and a tether connecting the headliner to the tether bracket, the tether being configured to control movement of the headliner during deployment of the air bag;

wherein the tether bracket includes an anti-rotation tab that is engageable with an aperture in the vehicle to inhibit rotation of the tether bracket with respect to the vehicle, and wherein a portion of the intermediate member is also configured to extend into the aperture in the vehicle that receives the anti-rotation tab.

20. The headliner assembly of claim 19 wherein, during deployment of the air bag, the tether is configured to cooperate with the headliner to define a hinge line on the headliner proximate a side edge of the headliner, such that the headliner is bendable along the hinge line.

21. The headliner assembly of claim 19 wherein the tether bracket is configured to deform upon deployment of the air bag to thereby absorb deployment energy.

22. The headliner assembly of claim 21 wherein the tether bracket is configured to bend without breaking upon deployment of the air bag to thereby absorb deployment energy.

23. The headliner assembly of claim 21 wherein the tether bracket is configured to lengthen without breaking upon deployment of the air bag to thereby absorb deployment energy.

24. The headliner assembly of claim 19 wherein the tether bracket includes an attachment portion that is configured to be attached to the vehicle, and a leg portion having one end attached to the attachment portion and an opposite free end, and wherein the leg portion is connected to the tether and bends with respect to the attachment portion and without separating from the attachment portion upon deployment of the air bag.

* * * * *